United States Patent [19]

Bredovskis

[11] Patent Number: 5,007,609
[45] Date of Patent: Apr. 16, 1991

[54] TIRE RETAINER FOR DOCK

[76] Inventor: Atis Bredovskis, 368 Rouge Hills Dr., West Hill, Ontario, Canada, M1C 2Z5

[21] Appl. No.: 419,333

[22] Filed: Oct. 10, 1989

[51] Int. Cl.$^5$ .............................................. A47H 1/16
[52] U.S. Cl. .................................... 248/303; 114/219; 211/19; 248/309.1
[58] Field of Search ...................... 248/309.1, 303, 301, 248/304; 211/23, 19, 20; 24/130, 129 R; 114/218, 219, 220, 343, 364; 224/103, 920, 42.12

[56] References Cited

U.S. PATENT DOCUMENTS

| | | | |
|---|---|---|---|
| 672,070 | 4/1901 | Smith | 211/19 |
| 921,703 | 5/1909 | Hubbard | 248/303 |
| 1,579,904 | 4/1926 | Zaugg | 248/303 |
| 2,506,119 | 5/1950 | Tregear | 248/304 |
| 2,734,206 | 2/1956 | John | 114/364 |
| 2,865,049 | 12/1958 | Duerksen | 248/303 |
| 4,022,452 | 5/1977 | Dupre | 114/219 X |
| 4,706,594 | 11/1987 | Burns | 114/218 X |
| 4,830,196 | 5/1989 | Csanady | 211/19 |

*Primary Examiner*—Carl D. Friedman
*Assistant Examiner*—Daniel Hulseberg
*Attorney, Agent, or Firm*—Smart & Biggar

[57] ABSTRACT

The invention provides a device for suspending a tire from the edge of a structure used for docking boats, and comprises: a hook retainer; a hook mounted on the hook retainer; the hook having a cradle to accept the edge of a tire wall and a free end to enter the interior space between the walls of the tire; and the hook retainer being formed for securement to the docking structure.

1 Claim, 4 Drawing Sheets

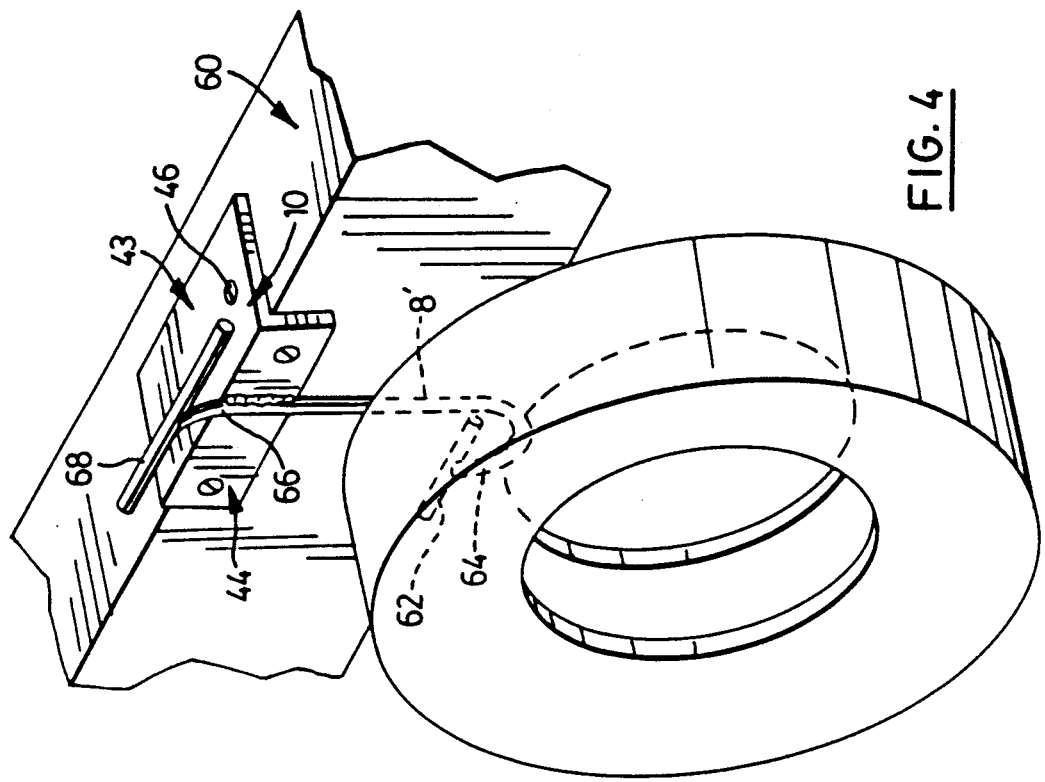
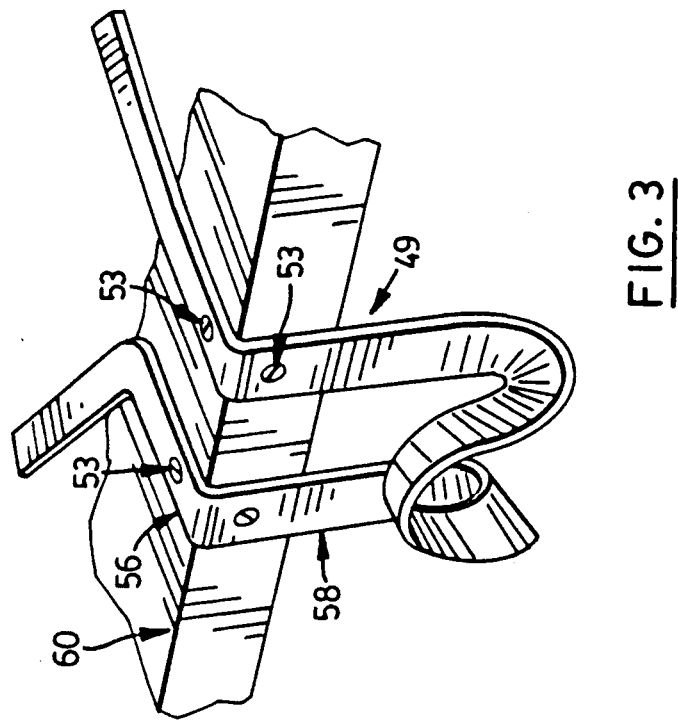

TIRE RETAINER FOR DOCK

FIELD OF THE INVENTION

This invention relates to a device used for retaining a tire between vertical surfaces, such as the side of a dock and the hull of a boat.

BACKGROUND OF THE INVENTION

Tires, U-shaped in cross-section, have been used for many years to buffer boat hulls bumping against docks. The usual practice has been to nail the tire directly to the dock. Alternatively, the tire may be tied using rope or wire.

The problems with nailed securement include mutilation of the tire, unsightliness, difficulty in mounting, and the impracticality of dismounting and remounting of the tire when necessary.

When the tire is nailed to the dock, winter ice formations can tear the tire from its securement. This problem could be avoided if the securement permitted easy dismounting of the tire for the winter season and easy remounting for the summer season. The problem could also be avoided by providing a securement which would permit the tire some movement, without dismounting, in response to the force of the ice.

In the case where ropes or wires are used as a means of securement, it is sometimes overly time consuming to correctly position the tire on the dock and there may not always be a readily available structure for securing the free end of the rope or wire. Rope is also prone to rotting.

It is an object of this invention to provide a tire retainer that is easily mountable to a dock and which permits the quick dismounting and remounting of the tire.

It is a further object of the present invention to provide a tire retainer that is inexpensive to manufacture, is not unsightly and does not mutilate the tire.

It is a further object of the present invention to provide a tire retainer that is not subject to rotting and re-useable.

It is a further object of the present invention to provide a tire retainer that permits the mounted tire to shift in its mounted position without being torn from its securement.

SUMMARY OF THE INVENTION

According to one aspect of the present invention, there is provided a tire retainer for retaining a tire, U-shaped in cross-section, between a vertical surface and the hull of a boat comprising: a hook retainer; a hook mounted on the hook retainer; the hook having a cradle to accept the edge of a tire wall and a free end to enter the interior space between the walls of a tire; and the hook retainer being formed for securement to a dock or the like.

According to yet another aspect of the present invention, there is provided a device for suspending a tire at the edge of a docking structure comprising: a hook with a foot portion and a leg portion; the foot portion of the hook having a tip adapted to enter into the interior space between the walls of the tire; the leg portion of said hook being adapted to extend vertically downward of the edge of the docking structure; and means associated with said hook for receiving securement fasteners for extention into both horizontally and vertically meeting sides of the docking structure.

The tire retainer or device for suspending a tire may also include as an integral part thereof, cleats for securing a rope from a boat. The cleats as well as the uppermost end of the tire retainer or device for suspending the tire may be bent slightly forward (towards the tire) to assist in avoiding dislodgement of the tire from the device by upward pushing forces.

BRIEF DESCRIPTION OF THE DRAWINGS

The invention will be clearly understood after reference to the following description of the embodiments read in conjunction with the drawings in which:

FIG. 3 shows a further embodiment of the tire retainer mounted to a dock.

FIG. 4 is a perspective view of a further embodiment the tire retainer mounted to a dock.

DETAILED DESCRIPTION OF THE DRAWINGS

Figure 2A:
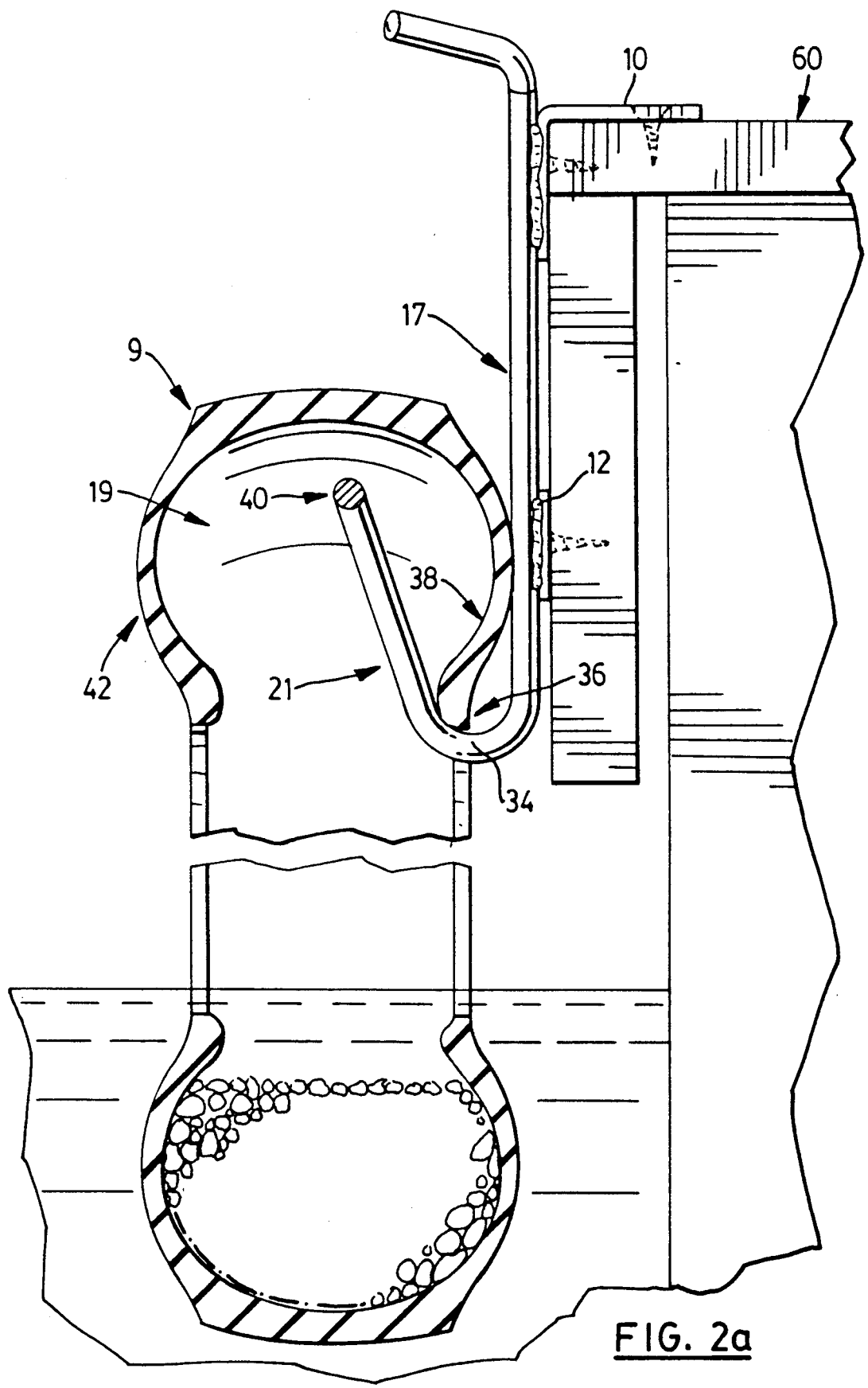
FIG. 2a is generally a cross-section taken along 2—2 of FIG. 1 varied from FIG. 2 only to show an alternate preferred embodiment wherein the cleat is bent towards the tire.

As shown in the drawings, the tire retainer includes a hook, generally referred to by the numeral 8, mounted to a hook retainer generally referred to by the numeral 10.

Figure 1:
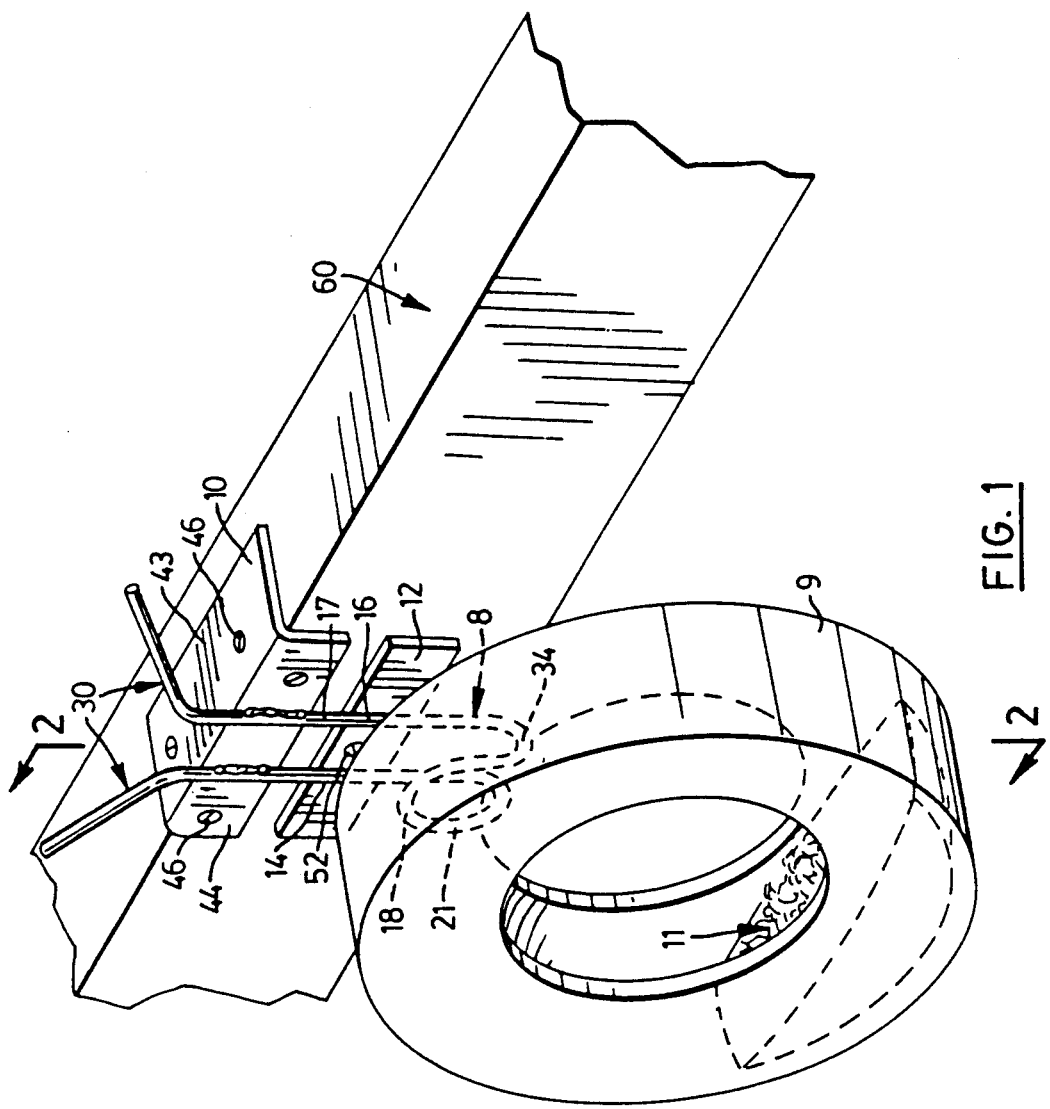
FIG. 1 is a perspective view of the preferred embodiment mounted to a dock and retaining a tire.
Figure 2:
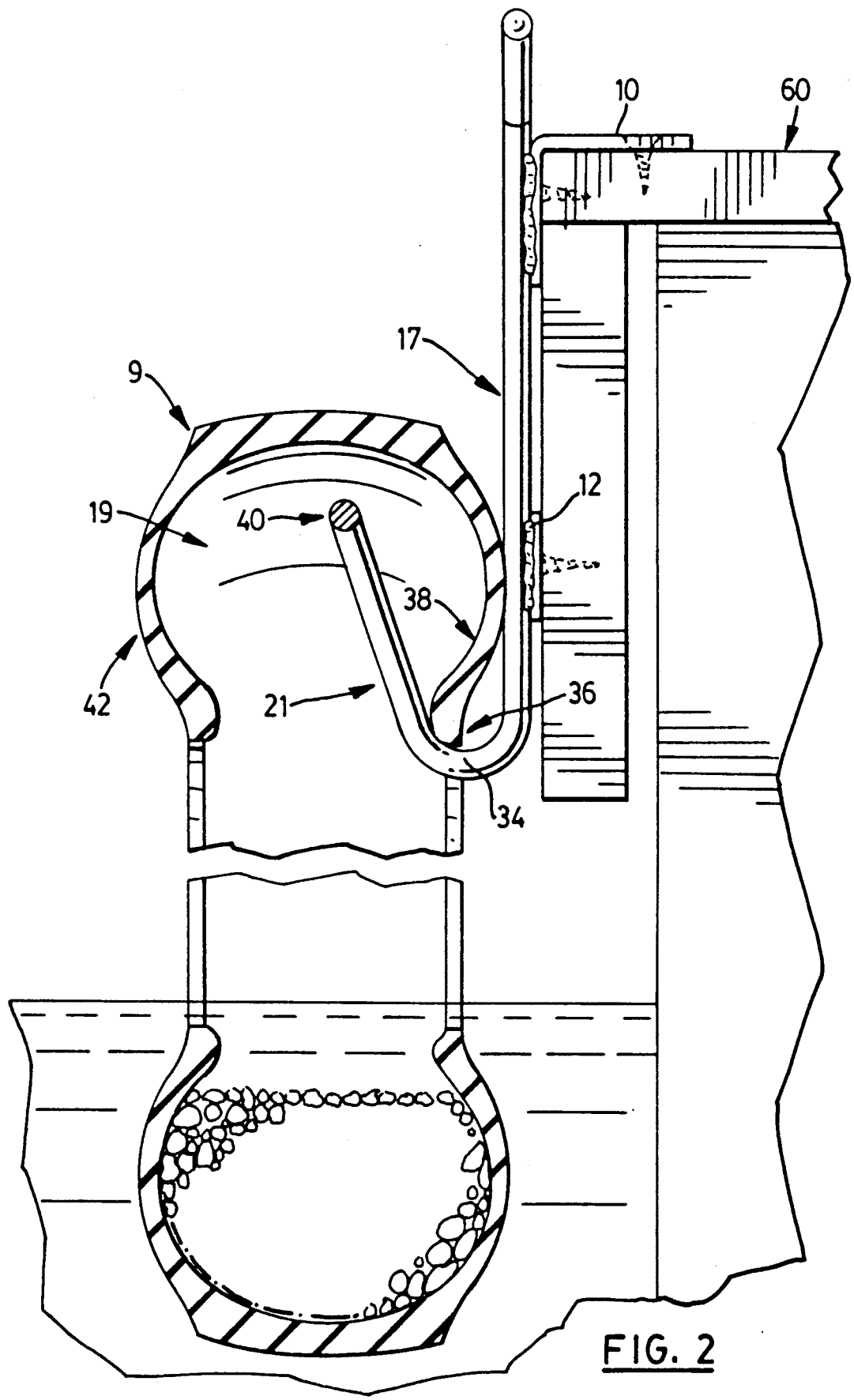
FIG. 2 is a cross-section taken along 2—2 of FIG. 1 showing the manner in which the tire is mounted to the preferred embodiment.

The tire 9 is placed on the hook as indicated in FIGS. 1 and 2. Rocks 11 or some other weighty material are preferably then placed in the bottom of the tire cavity to help counter any vertically upwardly forces which may dislodge the tire from the hook.

The hook 8 is preferably formed from a single rail. The single rail is configured to form two j-shaped sections 14, 16 in substantially parallel arrangement joined at their feet by a transversely extending section 18. In the preferred embodiment, the transversely extending section 18 forms the tip of the hook adapted to enter into the interior space 19 between the walls of the tire 9, but it will be apparent that the transversely extending section 18 might as easily be formed at the upper end or head of the j-shaped sections 14, 16 (not shown) so as to join them. As a further alternative, the j-shaped sections may be formed separately from each other and subsequently attached to each other by various means such as bar welded transversely thereto. In some cases, only a single j-shaped section might be used, as in FIG. 4.

However, when a plurality of j-shaped sections are used, forming the transversely extending section 18 at the feet allows one to position the hook so that the upper free ends are situated above the hook retainer 10 permitting the upper free end portions of the j-shaped sections to be bent in opposing directions as at 30, to form cleats around which a rope from a docked boat may be tied.

Alternatively, the same upper free end portions of the j-shaped sections situated above the tire 9 may be bent slightly forward (towards the tire in FIG. 1) to form retaining flanges to prevent the tire, when mounted on the hook, from being pushed straight upwardly and off of the hook by an upward force such as rising water. Of course, any such retaining flange should not extend forward of the dock structure a distance beyond the hook since this might result in damage to a boat hull secured to the dock.

The j-shaped sections 14, 16 each have a cradle 34 to accept the edge 36 of a tire wall 38 of the tire 9 and a free end 40 to enter the interior space 19 between the walls 38, 42 of the tire 9. Each j-shaped section has a leg portion 17 and a foot portion 21.

The rail from which the j-shaped sections may be configured is preferably made from steel but other suitable materials such as certain plastics and metals other than steel may be used providing the necessary structural strength can be obtained for retaining a tire as well as surviving the impact of a boat hull.

The tire 9 sits mounted on the hook 8 with nothing fixing the connection between the tire 9 and the tire retainer other than the weight and shape of the tire. Even if the tire 9 is left mounted on the tire retainer for the duration of the winter, the tire may be lifted, for example by ice, from the cradle 34 to the extent permitted by the height of the tip of the hook (as at 18 in FIG. 1) without being dismounted. The tire is permitted a certain amount of movement upon the hook before it will be dismounted and, because the tire is not nailed to the dock or otherwise secured, there is no tearing of the tire 9. In contrast, where there is a nailed securement, a small amount of movement can cause the tire to be torn from its mounting.

The tire 9 can also be easily removed from the tire retainer by merely removing the rocks and lifting it up off the hook 8. Thus, the owner can remove the tire for storage before the winter season sets in and remount the tire for use in the next boating season. The owner can also easily replace the tire or move the tire to another tire retainer as required.

The hook retainer 10 which mounts the hook 8 to the dock surface preferably provides both horizontally and vertically extending securements to the dock. It will be apparent that the vertically extending securement is more effective than the horizontally extending securement in counteracting forces in the horizontal direction and that the horizontally extending securement is more effective than the vertically extending securement in counteracting forces in the vertical direction. To obtain this securement, the hook retainer 10 has two surfaces 43, 44 formed at substantially right angles to each other to embrace the mating horizontal and vertical surfaces of the dock 60. Each of the surfaces 43, 44 are formed with holes to admit fasteners 46 to secure the hook retainer 10 to the dock.

Preferably the hook retainer 10 is made from a length of angled metal composed of steel but any suitable material such as plastics or metals other than steel may be used providing that the necessary retaining strength is present.

The fasteners 46 used to secure the hook retainer 10 to the mating vertical and horizontal surfaces of the dock may be any type of securing means that will hold the tire retainer to the dock. For instance, the fasteners may be, as in the illustrated preferred embodiment, thread screws threadedly screwed into the dock, or they may be nails.

There is also in addition to the hook retainer 10, an optional connecting bar 12 formed with a hole 52 to accommodate a fastener to further secure the j-shaped sections 14, 16 to the vertical surface and to rigidify the tire retainer as a whole. Preferably, the connecting bar 12 is made from steel but other suitable materials such as certain plastics or metals other than steel may also be used.

Alternatively, the connecting bar 12 may serve as the sole means for fastening the tire retainer to the dock structure 60, and hence may under such circumstances also be referred to as a hook retainer.

The j-shaped sections 14, 16 in the preferred embodiment are mounted to the connecting bar 12 and/or to the hook retainer 10 by a welded connection. In the case where plastic material is used, the parts may be fused together. Those skilled in the art will also recognize other ways of fastening the hook retainer to the j-shaped sections.

In the alternative embodiment illustrated in FIG. 3, the tire retainer, generally referred to by the numeral 49, is formed from a single piece of flat strip metal or other suitable material. It extends horizontally, as at 56, and vertically, as at 58, to permit its seating on the meeting horizontal and vertical surfaces of the docking structure. Once seated, it is then secured by fasteners 53. In this embodiment, although the hook retainer is integral with the hook portion of the tire retainer, the latter is still considered to be mounted on the former.

By virtue of the hook retainer, the tire retainer can be easily and quickly mounted onto a dock. It is easily positioned where desired and its mounting does not require great physical effort. Significantly, the tire does not have to be carried or held while the tire retainer is mounted.

Instead of a single difficult operation involving the lifting and holding of the tire while it is secured, as is the case when the tire is nailed directly to the dock, there are two separate simple operations. The first simple operation is the fastening of the tire retainer to the dock, and the second simple operation is the mounting of the tire onto the hook 8.

In use, a tire 9 is mounted on the tire retainer by merely lifting the tire onto the free end (as at 18 of FIG. 1) of the hook 8. Once mounted, the tire 9 can be easily removed or remounted on the hook 8 as desired, by simply lifting it (and moving it forward in the embodiment with the cleats angled forward). Unlike the prior art, no further nailing or tying is required.

In the alternative embodiment illustrated in FIG. 4, there is only one j-shaped section 15 joined by welded connection to hook retainer 10 which in turn may be fastened via fasteners through holes 46 to dock 60. A horizontal member 62 is located at the lower free end 64 of the hook 8'. The horizontal member 62 is of proportions suitable to permit the stable mounting of a tire thereon. The uppermost opposite end 66 of the hook 8' has optionally a second horizontal member 68 around which a rope from a docked boat may be tied. Alternatively, uppermost opposite end 66 and the second horizontal member 68 may be bent slightly forward toward the tire (not illustrated) to form a retaining flange to help prevent the tire, when mounted on the hook, from being pushed straight upwardly and off of the hook by an upward force.

Securement can be varied. For example, where the legs of the j-shaped section (17) adjacent their upper ends are formed with a right angled bent to embrace the meeting edge surfaces of the docking structure as shown in FIG. 3, holes may be formed through the actual flat strip metal or other suitable material to admit securing thread screws or nails.

Because the structure of the tire retainer is simple, it is easy and inexpensive to manufacture. Once mounted, it can be left on the dock regardless of whether it is carrying a tire. It provides the user with a mounting that has benefits not before achieved.

Embodiments other than the those illustrated but still within the scope of the invention will be apparent to those skilled in the art. It is not intended that the specification be read in a limiting manner but rather in a manner that appreciates the substance of the invention hereinafter claimed.

I claim:

1. A tire retainer, for use in combination with a tire having walls and being U-shaped in cross-section, for the purpose of retaining the tire between a vertical surface and the hull of a boat, said tire retainer comprising:

a hook retainer formed for securement to a dock or the like;

a single-piece hook and cleat assembly mounted on said hook retainer;

said hook of said single-piece hook and cleat assembly having a cradle to accept the edge of a tire wall and a free end to enter the interior space between the walls of the tire;

said cleat of said single-piece hook and cleat assembly integrally formed at the end opposite the free end of said hook for securing a rope or the like from a boat, said cleat bent sufficiently forwardly to extend over the cradle to assist in avoiding dislodgement of the tire as a result of upward forces, but not bent to an extent likely to result in damage to a boat hull; and said tire retainer shaped to permit quick dismounting and remounting of the tire thereon, and to accommodate limited movement of the tire in response to upward forces without the tire being dislodged or the hook retainer being torn from its securement.

* * * * *